Patented Oct. 14, 1930

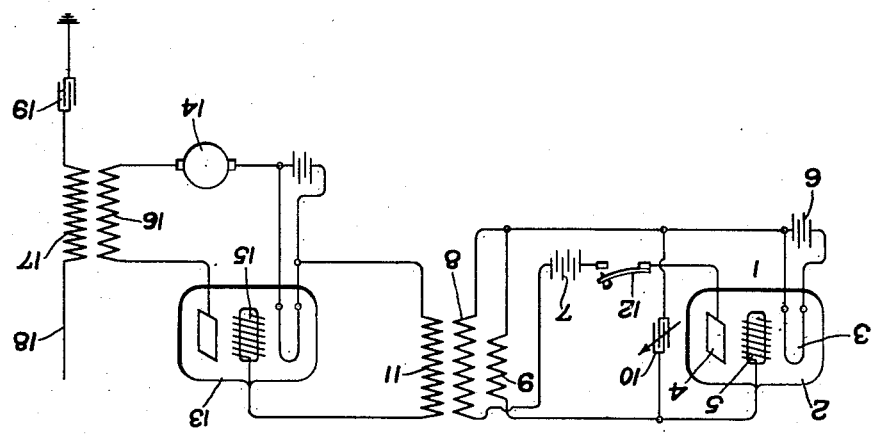

1,778,457

UNITED STATES PATENT OFFICE

IRVING LANGMUIR, OF SCHENECTADY, NEW YORK, ASSIGNOR TO GENERAL ELECTRIC COMPANY, A CORPORATION OF NEW YORK

ALTERNATING-CURRENT GENERATION

Original application filed October 29, 1913, Serial No. 797,987. Divided and this application filed April 24, 1924. Serial No. 708,820.

My present invention relates to the production of alternating currents of any frequency desired from any suitable source of either direct or alternating current, and more particularly to the production of high frequency currents and the supplying of such currents to a load circuit.

The present application is a division of my prior application Serial No. 797,987, filed October 29, 1913.

In carrying my invention into effect I make use of suitable circuit arrangements used in conjunction with an electron discharge device which may be of the so-called audion type. In the circuit arrangements used the frequency of the oscillations generated is dependent upon the resonant frequency of the circuit arrangement used with the device. If the currents produced are supplied to a load circuit in the customary manner, that is, by coupling the load circuit to the circuit in which the alternating currents are produced then the frequency of the currents produced will also be dependent to a certain extent upon the constants of the load circuit. If any of these constants vary then the frequency of the currents produced will also vary.

This arrangement is unsatisfactory in many cases particularly where the currents produced are to be employed in a high frequency signaling system in which it is desirable that the frequency of the currents employed shall remain constant.

The object of my present invention is to overcome this disadvantage and provide a system in which the frequency of the currents supplied to a load circuit may be maintained constant irrespective of changes in the constants of the load circuit. In obtaining this object of my invention, I interpose between the oscillation producer and the load circuit a relay which may also be of the electron discharge or audion type and which has such circuit connections that there will be substantially no reaction between the load circuit and the circuits which determine the frequency of the oscillations produced. This relay may also preferably serve as an amplifier and thereby cause to be delivered to the load circuit a much greater amount of energy than that which is represented by the oscillations originally produced.

The nature of my invention will best be understood by reference to the following description taken in connection with the accompanying drawing in which I have shown diagrammatically one way in which my invention may be carried into effect.

In the drawing 1 represents an electron discharge tube which comprises an evacuated receptacle 2 in which is placed a cathode 3, an anode 4, which in some cases may be in the form of a plate, and a conducting body 5, which is preferably in the form of a grid, interposed between the cathode and anode. The cathode used is preferably in the form of a filament which may be raised to incandescence by current from any convenient source as the battery 6. While this is the preferred method for causing the cathode to emit electrons, other methods may be used. The two electrodes 3 and 4 are connected by an oscillatory circuit containing an external source of current 7, which may be a battery as shown, or may be either a direct or alternating current generator, and an inductance 8; the circuit thus formed for convenience in description I call the plate circuit. The cathode is also connected externally with the grid 5 through an inductance 9. The oscillatory circuit thus formed I designate the grid circuit. The two circuits are preferably coupled together by placing the inductance 8 in inductive relation to the inductance 9. This coupling may be a very loose one or may be omitted entirely as the capacity between the electrodes and the grid 5 may electrostatically couple the two circuits together sufficiently to produce a current in the grid circuit whenever there is a change in the current flowing in the plate circuit. If the grid were absent, there would be a steady flow of current in the plate circuit between the electrodes. With the grid circuit connected, however, as soon as current starts to flow in the plate circuit, a current is induced in the grid circuit. If the inductances 8 and 9 are wound in the same direction, when current in the plate circuit begins to build up, then the current in the grid circuit will tend to flow in the opposite direction and the grid will become negatively electrified. This cuts down the flow of current in the plate circuit and as the current decreases, the grid loses its negative potential and becomes positive. This allows the current to increase again in the plate circuit. These changes may take place with great rapidity, their frequency depending upon the natural periods of the two circuits. The frequency of the current changes may be readily varied by varying the constants of the grid circuit and by so doing, current of any frequency desired may be obtained in the coil 11, which should be closely coupled to the coil 8, and the current so obtained may be used for any purpose desired. One convenient way of varying the frequency is by the use of an adjustable condenser 10 in the grid circuit.

I have also shown in the drawing a system whereby oscillations produced in the manner described may be applied for transmitting signals by wireless telegraphy. In order to be able to break up the oscillations into successive wave trains as required to produce signals, a key 12 may be inserted in the plate circuit. If the oscillations produced were supplied directly to a load circuit such as an antenna, as for example, by including the coil 11 in the antenna circuit, then the frequency of the oscillations produced would be dependent upon the constants of the antenna and any momentary undesired change in those constants would produce a corresponding change in the frequency of the oscillations produced. This disadvantage may be obviated however by the use of a second electron discharge tube 13 similar in construction to the first one, but preferably adapted to handle a greater amount of energy. I have indicated in the plate circuit of this second tube as a source of current a high voltage generator 14, although other sources of current may be used if desired. The oscillations produced in in the coil 11, which is connected to the grid circuit of the second tube produce alternately positive and negative potentials on the grid 15. When the grid potential is negative the current in the plate circuit is interrupted and when the grid potential becomes positive, current flows through the plate circuit and the primary 16 of a transformer whose secondary 17 is connected directly in the circuit of antenna 18. The antenna is connected to earth through the condenser 19 in the usual manner. By this means it will be seen that oscillations of the same frequency as those set up in the coil 11 but representing much greater energy will be impressed upon the antenna, and that the frequency of the oscillations supplied will be independent of the antenna constants. It will of course be understood that this method of amplifying oscillations and supplying them to a load circuit will be useful whether the oscillations are produced by the system which I have disclosed or by other methods, such for example, as by a high frequency alternator.

What I claim as new and desire to secure by Letters Patent of the United States, is:

1. An oscillation generator comprising a resonant circuit for determining the frequency supplied by said generator, a load circuit adapted to be energized by said generator and a three electrode electric discharge repeater for transferring alternating current energy from said generator to said load circuit and preventing said load circuit from reacting on said generator.

2. An oscillation generator susceptible to reactive effects, an alternating current load circuit and a three electrode asymmetrically conducting repeater for transferring alternating current of the generator frequency to said load circuit.

3. An oscillation generator susceptible to reactive effects, an alternating current load circuit and an audion repeater for transferring current of the generator frequency to said load circuit.

4. An oscillation generator of the feedback type, a reactive load circuit, an asymmetrically conducting repeater device having three electrodes, means for coupling said generator to two of said electrodes and means for coupling said load circuit to one of said first mentioned electrodes and to the third electrode.

5. An oscillation generator of the audion type, an alternating current load circuit and an audion repeater between said generator and said load circuit whereby the frequency of the current supplied by said generator is independent of the character of said load circuit.

6. An oscillation generator comprising a discharge device having an input circuit and an output circuit reacting on said input circuit, a load circuit for coupling said generator to a load, and an asymmetrically conducting repeater in circuit between said generator and said load for preventing said load from reacting on said generator.

7. In a system of distribution, an oscillation generator comprising a discharge device having an anode, a cathode and an impedance controlling electrode and input and output circuits, means for transferring energy from said output circuit to said input circuit, a load circuit energized from said output circuit, and a discharge device constituting a repeater having an anode, a cathode and an impedance controlling electrode connected between said output circuit and said load circuit whereby the load is prevented from reacting on said generator.

8. An electron discharge device having an input circuit and an output circuit reacting upon said input circuit, a load circuit energized from said output circuit, and an asymmetrically conducting repeater element between said output circuit and said load circuit.

9. In a system of distribution, a circuit for absorbing energy, a discharge device in said circuit for amplifying said energy, an output circuit for said discharge device, means for transferring energy from said output circuit back to said first circuit, a load circuit energized from said output circuit, and an asymmetrically conducting repeater device between said output circuit and said load circuit.

10. In a system of distribution, a discharge device having an anode, a cathode and an impedance controlling electrode and input and output circuits, means for transferring energy from said output circuit to said input circuit, a load circuit energized from said output circuit, and a discharge device constituting a repeater having an anode, a cathode and an impedance controlling element connected between said output circuit and said load circuit whereby the load is prevented from reacting on said first-mentioned discharge device.

11. A generator of sinusoidally varying waves comprising reactance elements for determining the frequency of the waves generated, the frequency of said generator being affected by the reaction of other reactance elements on said frequency determining reactance elements, a reactive load circuit connected to said generator to be supplied with sinusoidal waves of the frequency of the waves generated by said generator, in combination with means for preventing said load circuit from affecting the frequency of the waves supplied comprising a space discharge repeater capable of repeating from said generator to said load circuit but not capable of repeating from said load circuit to said repeater.

12. A generator of alternating current waves the frequency of which varies as the impedance connected to said generator varies,—other things, being equal—; a load circuit consisting of a radio antenna to be supplied with alternating current of the frequency produced by said generator, and means for preventing said load circuit from reacting on and affecting the frequency of said generator comprising a unidirectional repeating device capable of repeating only in the direction from said generator to said load circuit.

13. Means for impressing an unvarying alternating voltage upon a load circuit consisting of a radio antenna comprising an alternating current generator of the type including a discharge device having a feed-back circuit and frequency determining reactance connected thereto, said generator being such that the uniformity of its oscillations would be destroyed by variations in impedance of a load connected thereto, and a repeater having an input circuit and an output circuit, the input circuit being connected to said generator and the output circuit being connected to said load circuit, said repeater being such that the impedance of the input circuit over the working range of frequencies is a substantially constant quantity independent of the electrical condition of the output circuit or of the load circuit connected thereto.

14. An oscillation generator comprising an electric discharge device having input and output circuits which are coupled in feed-back relation and which comprise reactances that substantially determine the frequency of the oscillations produced, a reactive load circuit to which oscillations are to be supplied, and an alternating current repeater having an input circuit associated with said generator to receive alternating current therefrom, and an output circuit associated with said load circuit to impress repeated alternating current of the frequency produced by said generator thereupon, said repeater input and output circuits being asymmetrically connected whereby the impedance of the input circuit is substantially negligibly influenced by the impedance conditions of said output circuit and said load circuit is prevented from reacting upon said generator to change the characteristics of the generated oscillations.

In witness whereof, I have hereunto set my hand this 23rd day of April, 1924.

IRVING LANGMUIR.